No. 671,550. Patented Apr. 9, 1901.
H. T. HALLOWELL.
SHAFT HANGER.
(Application filed Aug. 11, 1900.)
(No Model.) 4 Sheets—Sheet 1.
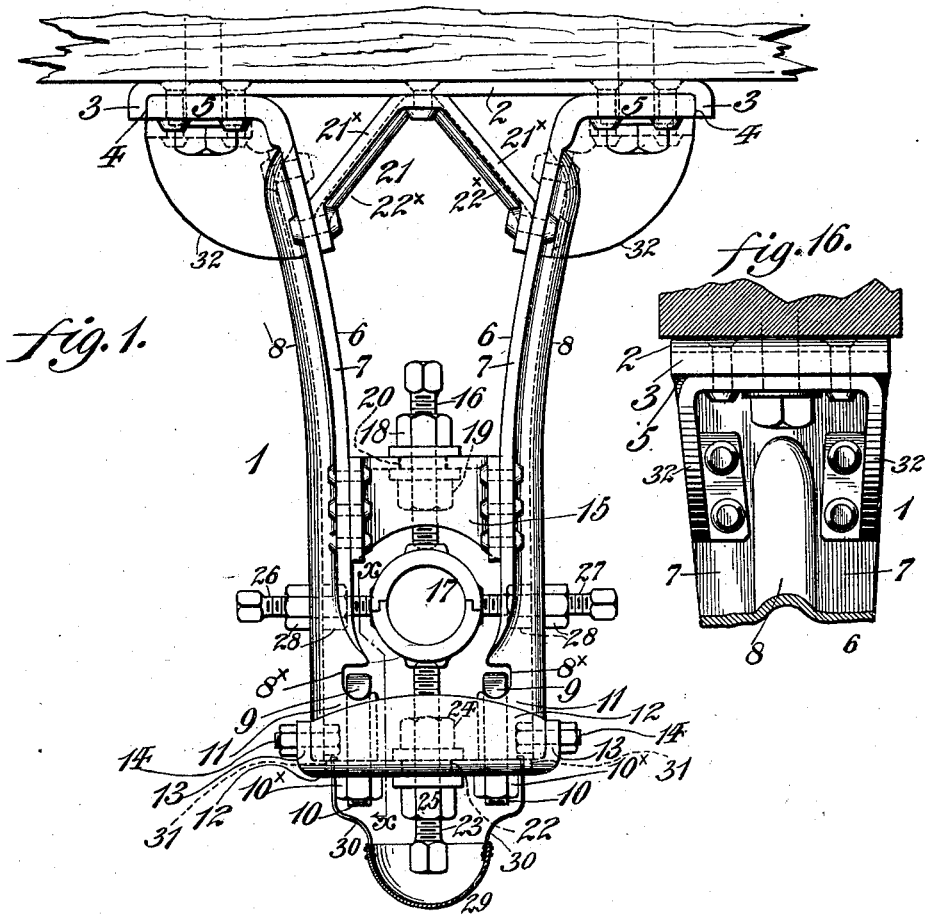
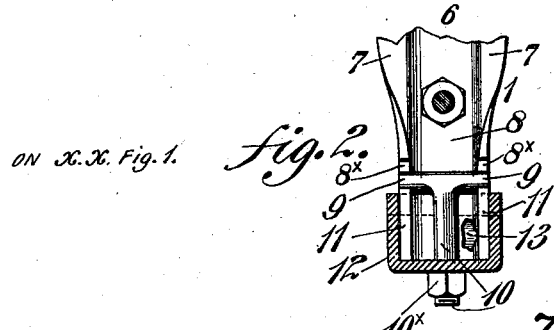
Witnesses
Inventor
Howard T. Hallowell.
By Wiedersheim Fairbanks
Attorneys No. 671,550. Patented Apr. 9, 1901.
H. T. HALLOWELL.
SHAFT HANGER.
(Application filed Aug. 11, 1900.)
(No Model.) 4 Sheets—Sheet 2.
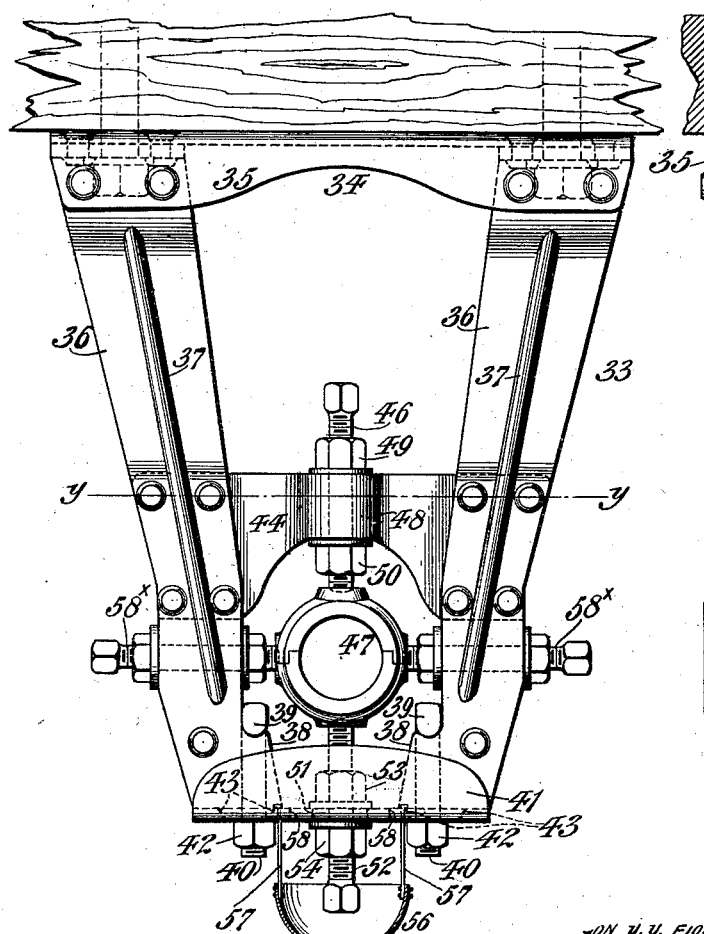
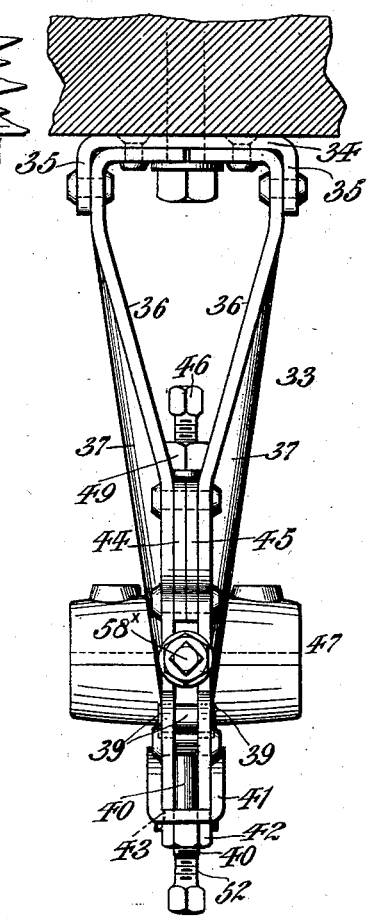
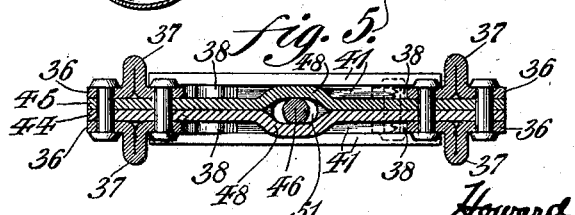
Witnesses
L. Douville
O. F. Eagle
Inventor
Howard T. Hallowell.
By Wiedersheim & Fairbanks,
Attorneys

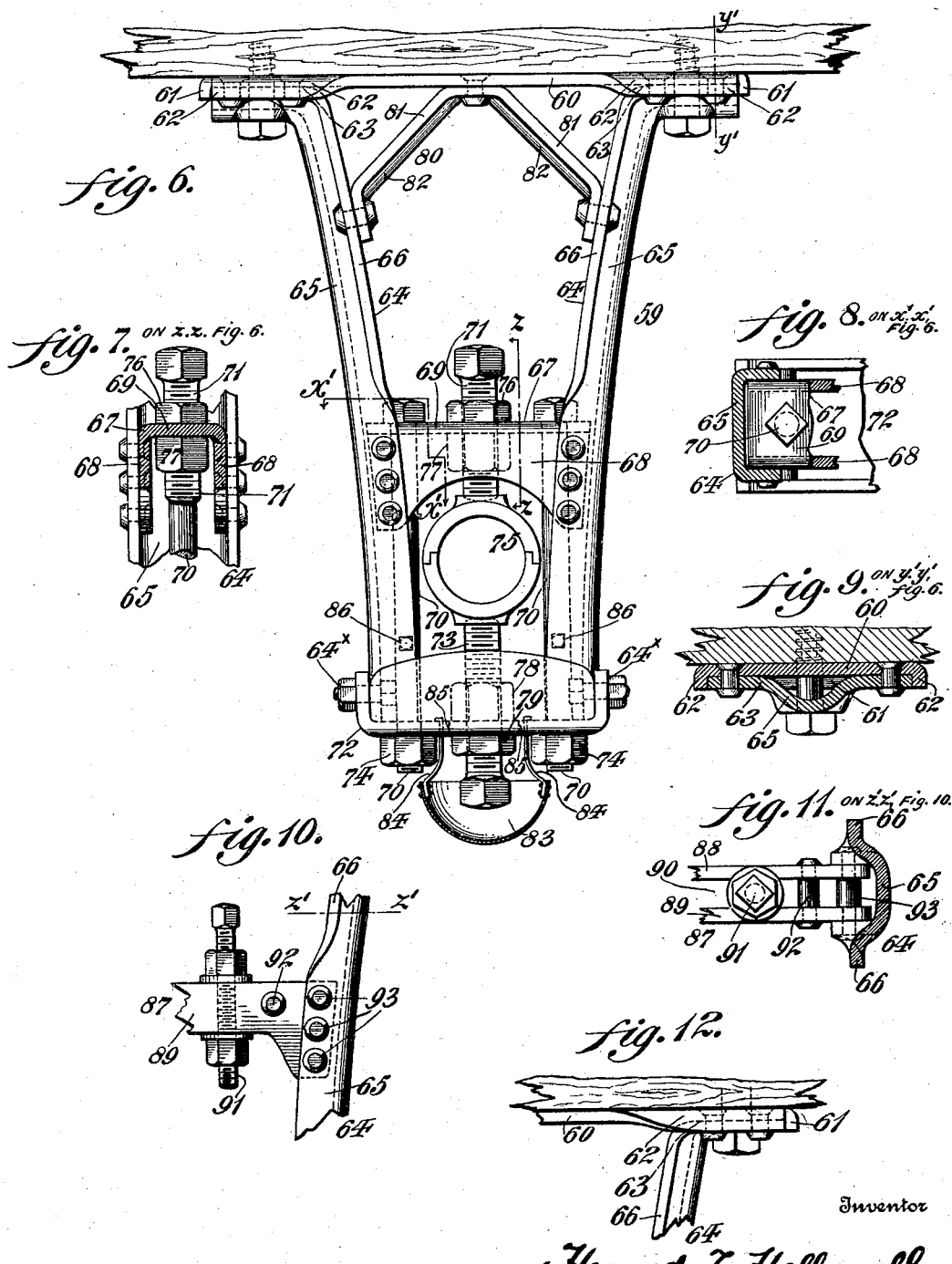

No. 671,550. Patented Apr. 9, 1901.
H. T. HALLOWELL.
SHAFT HANGER.
(Application filed Aug. 11, 1900.)
(No Model.) 4 Sheets—Sheet 4.
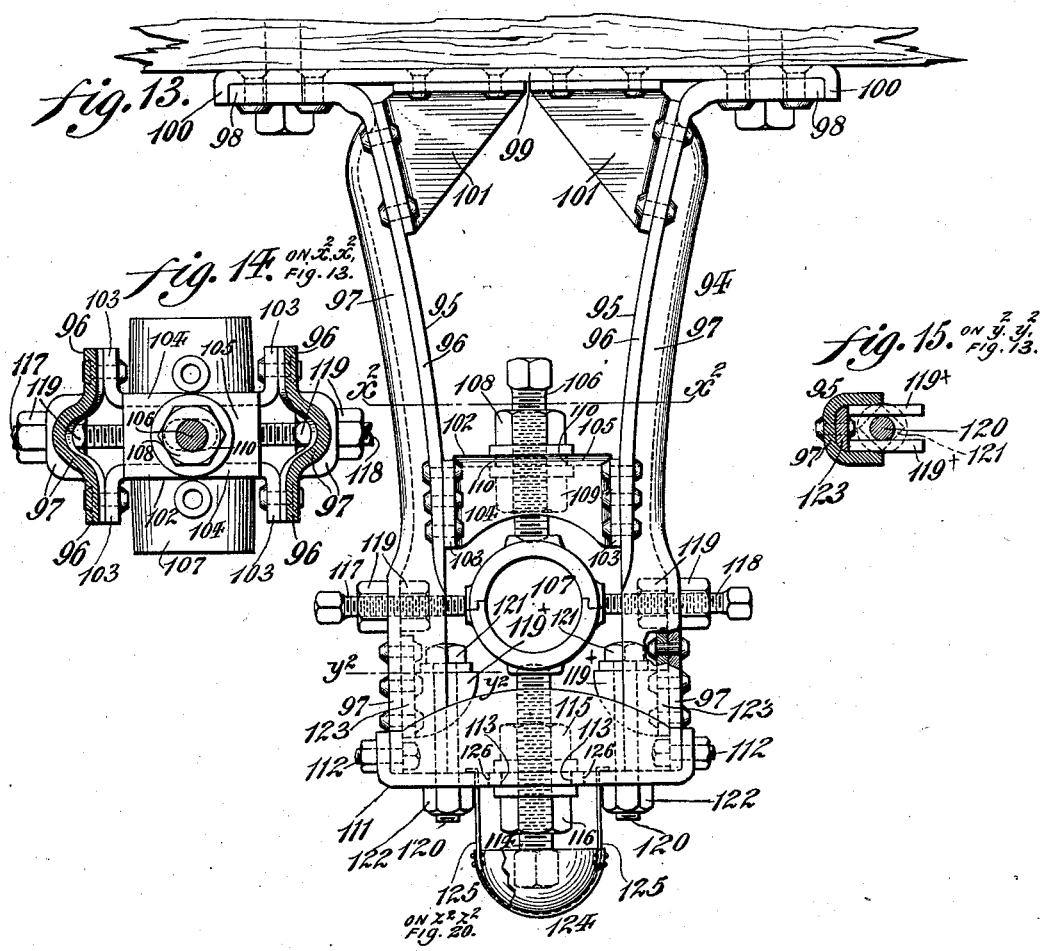

UNITED STATES PATENT OFFICE.

HOWARD T. HALLOWELL, OF PHILADELPHIA, PENNSYLVANIA.

SHAFT-HANGER.

SPECIFICATION forming part of Letters Patent No. 671,550, dated April 9, 1901.

Application filed August 11, 1900. Serial No. 26,550. (No model.)

*To all whom it may concern:*

Be it known that I, HOWARD T. HALLOWELL, a citizen of the United States, residing in the city and county of Philadelphia, State of Pennsylvania, have invented a new and useful Improvement in Shaft-Hangers, which improvement is fully set forth in the following specification and accompanying drawings.

My invention consists of an improved construction of a hanger, preferably formed of pressed metal shaped to the desired contour, my novel hanger having legs provided with feet, which are reinforced in a novel and effective manner, said legs having an intermediate brace common thereto and a lower detachable clamp whereby great strength and rigidity is attained.

It further consists of novel details of construction, all as will be hereinafter fully set forth, and particularly pointed out in the claims.

Figure 1 represents a side elevation of a shaft-hanger embodying my invention. Fig. 2 represents a partial side elevation at a right angle to Fig. 1 and a partial vertical section on line $x\ x$, Fig. 1. Fig. 3 represents a front elevation of another embodiment of my invention. Fig. 4 represents a side elevation of Fig. 3. Fig. 5 represents a horizontal section on line $y\ y$, Fig. 3. Fig. 6 represents a side elevation of another form of shaft-hanger. Fig. 7 represents a vertical section on line $z\ z$, Fig. 6. Fig. 8 represents a horizontal section on line $x'\ x'$, Fig. 6. Fig. 9 represents a vertical section on line $y'\ y'$, Fig. 6. Fig. 10 represents a side elevation of a portion of a shaft-hanger of another modification. Fig. 11 represents a partial plan view and partial horizontal section of the parts seen in Fig. 10, the section being taken on line $z'\ z'$, Fig. 10. Fig. 12 represents a side elevation of portions of a shaft-hanger of another modification. Fig. 13 represents a side elevation of another form of shaft-hanger. Fig. 14 represents a horizontal section on line $x^2\ x^2$, Fig. 13. Fig. 15 represents a horizontal section on line $y^2\ y^2$, Fig. 13. Fig. 16, Sheet 1, represents a side elevation of a portion of another embodiment of my invention.

Similar numerals of reference indicate corresponding parts in the figures.

Referring to the drawings, Figs. 1 and 2, 1 designates a shaft-hanger, preferably of wrought-steel and consisting of a plate 2, whose outer ends are bent at 3, it being noted that said bent portions act as abutments for the outer extremities 4 of the upper portions or feet 5 and that said plate 2 and feet 5 are riveted or otherwise secured together. Depending from the feet 5 are the sides or legs 6, which consist of flanges 7 and ribs 8, which latter strengthen said legs. In the present instance the flanges 7 do not extend to the bottom of the legs 6, but terminate above the recessed portions $8^\times$, which receive the laterally-projecting lugs 9 of the bolts 10, it being noted that the lower portions 11, which are substantially U-shaped or trough-shaped, of the members 6 are continuous of the members 8 and serve as supports for the bolts 10, which latter are provided with nuts $10^\times$ for fastening together the arms 6 and a trough-shaped clamp 12, through whose end portions 13 are passed the bolts 14 or similar fastening devices, so as to further secure said legs and clamp in juxtaposition. The legs 6 are further strengthened and also prevented from displacement relatively to each other by the brace 15, common thereto, which furthermore acts as a support for the bolt 16 which, when in its adjusted position, prevents the journal-box 17 from moving upwardly, it being noted that said bolt 16 has thereon the jam-nuts 18 and 19 which, when screwed tightly against the brace 15 prevent said bolt from displacement. The bolt 16 is passed through a slot 20 in the upper portion of the brace 15 in order that said bolt 16 may be moved nearer to or farther from a leg 6 for purposes of adjustment relatively to the lateral adjustment of the journal-box 17, said brace being riveted or otherwise secured to the legs 6. The legs 6 are strengthened and stiffened at their upper portions by a brace 21, which latter is riveted or otherwise secured to the said legs and to the plate 2 and is provided with flanges and ribs or corrugations $21^\times$ and $22^\times$, respectively. The clamp 12 is sometimes provided with a slot 22, through which is passed a bolt 23, which bears upwardly against the journal-box 17 to prevent the latter from moving downwardly when in an adjusted position. The object of the slot 22 is to permit the bolt 23 to be moved nearer to or farther from a leg 6 for the adjustment of said bolt 23 relatively to the lateral adjustment of the journal-box 17, it being noted that when the bolt 23 is in its adjusted position it is prevented from displacement by the jam-nuts 24 and 25. 26 and 27 designate bolts passing through the members 6, the ends of said bolts bearing against the journal-box 17 to prevent the displacement in a horizontal direction thereof when it is in its adjusted position, it being noted that said bolts 27 are retained in their adjusted positions by the jam-nuts 28. The hanger 1 may be provided with a drip-cup 29, pressed out of sheet metal and held in position thereon by spring-catches 30, which pass through openings 31 in the clamp 12. If desired, the hanger 1 may be still further strengthened by the braces 32, the location and manner of securing said braces in position being clearly understood from Fig. 16.

Referring to Figs. 3, 4, and 5, 33 designates a hanger consisting of a plate 34, whose sides 35 are deflected or bent downwardly and are riveted or otherwise secured to the legs 36, which latter are formed with projecting portions or ribs 37, which serve to strengthen said legs. The lower ends of the legs 36 are provided with projecting portions or shoulders 38, upon which rest the lugs 39 of the bolts 40, which latter pass through the clamp 41 and are provided with nuts 42, whereby said clamp is secured to the legs 36. The lower portions of the legs 36 are provided with tongues 43, which enter openings in the clamp 41, so as to assist the bolts 40 in securing said legs and clamp together. The legs 36 are further strengthened by the braces 44 and 45, which are riveted or otherwise secured to said legs, it being noted that said braces also serve as a support for a bolt 46, which bears against a journal-box 47 and prevents the latter from moving upwardly when in an adjusted position. The braces 44 and 45 are deflected, as at 48, to form a slot through which is passed the bolt 46, the object thereof being to permit said bolt to be moved nearer to or farther from a leg 36 to permit of the lateral adjustment of the journal-box 47, said bolt being retained in its adjusted position by the jam-nuts 49 and 50. The clamp 41 is provided with a slot 51, through which is passed a bolt 52, which latter bears against the journal-box 47 to prevent the same from moving downwardly when in its adjusted position, the object of said slot being to permit said bolt 52 to be moved nearer to or farther from a leg 36, so as to conform to the lateral adjustment of the box 47, said bolt 52 being retained in its adjusted position by the nuts 53 and 54. 56 designates a drip-cup suspended from the hanger by spring-catches 57, which pass through openings 58 in the clamp 41. $58^\times$ designates bolts which prevent lateral movement of the journal-box 47 when in adjusted position.

Referring to Figs. 6 to 12, inclusive, 59 designates a shaft-hanger consisting of a plate 60, whose ends are deflected or bent downwardly, as at 61, and a portion of its sides also bent downwardly, as at 62, to stiffen the upper portions or feet 63 of the legs 64, which may be riveted or otherwise secured to said plate. The legs 64 each consists of a trough-shaped body portion 65, provided for a portion of its length with flanges 66, which serve to strengthen said legs. Riveted or otherwise secured to the legs 64 is a brace 67, consisting of the sides 68 and a top 69, connecting said sides, said brace also serving as a support for the bolts 70 and 71. The lower ends of the legs 64 are bolted, as at $64^\times$, or otherwise secured to the clamp 72, through which passes the bolt 73 and also the bolts 70, it being noted that said bolts 70 are provided with nuts 74, which when tightened against the clamp 72 assist the bolts $64^\times$ in securing said legs and clamp together. The bolt 71 bears against a journal-box 75 to prevent the latter from moving upwardly when in its adjusted position, it being noted that said bolt is provided with jam-nuts 76 and 77 for retaining the same firmly in position when once adjusted. The bolt 73 bears against the journal-box 75 and prevents the latter from moving downwardly when in its adjusted position, it being noted that said bolt is provided with nuts 78 and 79 for retaining the same in position when adjusted. 80 designates a brace riveted or otherwise secured to the legs 64 and plate 60, said brace consisting of the flanges 81 and ribs 82. 83 designates a drip-cup formed from sheet metal and suspended from the hanger 59 by spring-catches 84, which pass through openings 85 in the clamp 72. In order to obtain greater strength, the bolts 70 may be provided with openings, through which may be passed the bolts 86 in Fig. 6, in which case the bolts 70 may be of comparatively short length, it being understood that the bolts seen at 86 are passed through openings in the arms 64, so as to secure said legs and bolts 70 together. The brace 87 (seen in Figs. 10 and 11) consists of the pieces 88 and 89, separated from each other, so as to produce a space 90 between them and through which a bolt 91, whose object is the same as that of the bolt 71, may pass.

The pieces 88 and 89 are in the present instance secured together by rivets 92 and 93 or similar fastening devices, it being noted that the rivets 93 pass also through the legs 64, so as to secure the brace 87 and said legs together. In Fig. 12 the trough-shaped portion 65 does not exist in that portion of a leg 64 which is secured to a plate 60, similar to that already described.

Referring to Figs. 13, 14, and 15, 94 designates a sheet-metal shaft-hanger consisting of the legs 95, formed with flanges 96 and a trough-shaped portion 97. The upper portions 98 of the members 95 are riveted or otherwise secured to a plate 99, whose extremities 100 are bent downwardly to form abutments for the ends of the feet 98 of the legs 95. The upper portion of the hanger 94 is reinforced by brackets 101, riveted or otherwise secured to the legs 95 and plate 99, said legs being further strengthened by a brace 102, formed of flanges 103 and side pieces 104, it being noted that the latter are joined by a top 105 and that said brace 102 is riveted or otherwise secured to the flanges 96. The brace 102 further serves as a support for a bolt 106, which bears against a journal-box 107 to prevent the latter from moving upwardly when in an adjusted position, it being noted that said bolt 106 is retained in an adjusted position by nuts 108 and 109 and that said bolt passes through a slot 110 (best seen in Fig. 14) in the upper portion 105 of the brace 102 in order that said bolt 106 may be moved nearer to or farther from a leg 95 to correspond with the lateral adjustment of the journal-box 107. The lower portions of the legs 95 are secured to a trough-shaped clamp 111 by bolts 112 or their equivalents. The bottom portion of the clamp 111 is provided with a slot 113, through which is passed a bolt 114, which bears against the journal-box 107 to prevent the latter from moving downwardly when in its adjusted position, it being noted that said bolt 114 is retained in its adjusted position by nuts 115 and 116 and that the slot 113 permits the bolt 114 to be moved nearer to or farther from a leg 95, so as to conform to the lateral adjustment of said journal-box. The journal-box 107 is prevented from lateral displacement after the same has been adjusted by bolts 117 and 118, provided with jam-nuts 119, which latter when tightened against the members 95 retain said bolts 117 and 118 firmly in position. Riveted or otherwise secured to the portions 97 of the legs 95 are brackets 119×, between which are passed the bolts 120, which latter assist the bolts 112 in securing together the members 95 and clamp 111, it being noted that the heads 121 of the bolts 120 rest against the members 119×, so that when the nuts 122 are tightened against the under side of the clamp 111 said bolts 120 will firmly retain in position the legs 95 and clamp 111. The members 119× are joined together by the portions 123, as best seen in Fig. 15. 124 designates a drip-cup, formed from sheet metal and secured to the hanger 94 by spring-catches 125, which pass through the openings 126 in the bottom portion of the clamp 111.

If desired, the braces 44 and 45 (seen in Fig. 3) may be integral with the legs 33, in which case said braces will assume the contour seen in said figure and between the legs 36.

Having thus described my invention, what I claim as new, and desire to secure by Letters Patent, is—

1. As an improved article of manufacture, a hanger comprising a plate, a plurality of depending legs connected therewith, said legs being provided with longitudinal strengthening-ribs, a brace secured to said legs, and a clamp having upwardly-extending side portions extending from end to end thereof, between which portions the lower extremities of said legs are situated and within which said legs are secured.

2. As an improved article of manufacture, a hanger comprising a plate, a plurality of depending legs having feet connected with said plate, said legs being provided with longitudinal strengthening-ribs and flanges, a brace situated between said legs and fastened to said flanges, and a clamp having upwardly-projecting side portions extending from end to end of said clamp between which the lower end portions of said legs are situated and within which they are secured.

3. As an improved article of manufacture, a hanger comprising a plate, a plurality of depending legs connected therewith, said legs being provided with longitudinal strengthening-ribs, a brace secured to said legs, and a clamp having upwardly-projecting side portions extending from end to end of said clamp between which the lower end portions of said legs are situated and to which they are secured, in combination with adjusting-bolts passing through said brace-legs and clamp, and a journal-box supported by said bolts.

4. A hanger having legs provided with recesses in the lower portions thereof, a clamp having a base and upwardly-extending sides and ends between which the lower end portions of said legs are seated, upright bolts passing through the base of said clamp and provided with lugs to enter said recesses, and other fastening devices passing through the ends of said clamp and the adjacent portion of said legs.

5. A hanger having legs provided with recesses in the lower portions thereof, a clamp having a base and upwardly-extending sides and ends between which the lower end portions of said legs are seated, upright bolts passing through the base of said clamp and provided with lugs to enter said recesses, and other fastening devices passing through the ends of said clamp and the adjacent portion of said legs, said legs being provided with feet, a plate to which said feet are secured, reinforcing devices fastened to said plate between said legs and having their lower end portions secured to the inner sides of the legs, and other reinforcing devices 32 constructed substantially as described and secured to the outer portion of said feet and to the upper end portion of said legs.

6. A hanger comprising a plate having its outer edges deflected, legs provided with feet secured to said plate within said deflected edges, a brace secured to said legs at substantially the middle portion of the length thereof, a clamp having a base portion and upwardly-extending sides and ends, said legs being provided with recesses in the lower end portions thereof, bolts passing through the base portion of said clamp and having lugs located within said recesses, adjusting-bolts passing through said brace and clamp, and a journal-box supported between said bolts.

7. A hanger, comprising legs provided with recesses in the lower portions thereof, said lower portions being trough-shaped and forming the lower termini of flanges on the outer portion of said legs, a brace secured to said legs, a clamp having a base and upwardly-extending sides, within which the lower portions of said legs are seated, upright bolts passing through said base, and having projections thereon adapted to engage said recesses, adjusting-bolts passing through said brace and clamp, and a journal-box supported between and engaged by the ends of said adjusting-bolts.

8. A hanger, comprising a plate, legs provided with feet secured to said plate, a brace for the intermediate portions of said legs, a clamp secured to the lower portion of said hanger and consisting of a base portion and upwardly-extending sides and ends, and fastening devices common to said clamp and legs, in combination with adjusting-bolts passing through said brace and clamp, and a journal-box supported between and engaged by the ends of said adjusting-bolts.

9. A hanger, comprising legs, and a detachable clamp secured to the lower portion of said legs, said clamp consisting of a base portion having upwardly-extending sides extending from end to end of said clamp and ends between which sides and ends the lower portions of said legs are seated, and fastening devices passing through the base portion and the ends of said clamp and securing said clamp to said legs.

10. As an improved article of manufacture, a hanger comprising a plate, a plurality of depending legs having feet connected with said plate, said legs being provided with longitudinal strengthening-ribs and flanges, and having their lower extremities substantially U-shaped, a brace situated between said legs and fastened to said flanges, and a clamp having upwardly-projecting side portions extending from end to end of said clamp between which the lower end portions of said legs are situated and within which they are secured.

HOWARD T. HALLOWELL.

Witnesses:
WM. CANER WIEDERSHEIM,
E. HAYWARD FAIRBANKS.